(12) United States Patent
Granig et al.

(10) Patent No.: US 8,552,316 B2
(45) Date of Patent: Oct. 8, 2013

(54) SENSOR MEASUREMENT SYSTEM USING PULSED CURRENT SIGNALS

(75) Inventors: Wolfgang Granig, Seeboden (AT); Dirk Hammerschmidt, Villach (AT); Mario Motz, Wernberg (AT)

(73) Assignee: Infineon Technologies AG, Neubiberg (DE)

( * ) Notice: Subject to any disclaimer, the term of this patent is extended or adjusted under 35 U.S.C. 154(b) by 515 days.

(21) Appl. No.: 12/820,289

(22) Filed: Jun. 22, 2010

(65) Prior Publication Data

US 2011/0308866 A1  Dec. 22, 2011

(51) Int. Cl.
*G01R 27/00* (2006.01)

(52) U.S. Cl.
USPC ....... 178/18.06; 324/658; 324/691; 73/304 R; 73/304 C

(58) Field of Classification Search
None
See application file for complete search history.

(56) References Cited

U.S. PATENT DOCUMENTS

| | | | |
|---|---|---|---|
| 4,675,670 A | | 6/1987 | Lalonde et al. |
| 5,182,545 A | * | 1/1993 | Goekler et al. ............... 340/620 |
| 6,693,444 B2 | * | 2/2004 | Lin et al. ....................... 324/698 |
| 7,129,714 B2 | | 10/2006 | Baxter |
| 7,339,384 B2 | | 3/2008 | Peng et al. |
| 7,836,763 B2 | * | 11/2010 | Harazin et al. ............... 73/304 C |
| 7,839,703 B2 | * | 11/2010 | Baker ....................... 365/189.15 |
| 2003/0122553 A1 | * | 7/2003 | Arias ............................. 324/658 |

* cited by examiner

*Primary Examiner* — Joseph Haley
(74) *Attorney, Agent, or Firm* — Eschweiler & Associates, LLC

(57) ABSTRACT

The disclosed invention provides a structure and method for easily measuring capacitive and/or resistive components of a sensor system. In one embodiment, the structure comprises a signal generator configured to output a load current to a measurement element containing measurement sensor elements and a parasitic capacitance. A controllable excitation voltage is generated, via integration of the load current on the parasitic capacitance, and output to the measurement sensor elements having capacitive and resistive components. The controlled voltage through the measurement device may be manipulated to cause the capacitive and resistive components to exhibit a transient effect. The resulting output current, provided from the measurement device therefore has transient response characteristics (e.g., the settling time, amplitude) that can be selectively measured by a measurement circuit to easily determine values of the capacitive and resistive measurement elements. Furthermore, dedicated demodulation techniques may be used to measure the capacitive and resistive components.

18 Claims, 9 Drawing Sheets

US 8,552,316 B2

SENSOR MEASUREMENT SYSTEM USING PULSED CURRENT SIGNALS

FIELD OF INVENTION

The present invention relates generally to a sensor system and in particular to a capacitive sensor system.

BACKGROUND OF THE INVENTION

In modern day vehicles, sensor systems are important components that provide vehicle operators with information pertaining to the condition of their vehicle. Typically, such sensor systems utilize a sensor comprising a measurement device to determine a voltage or digital value that is passed to a central professing unit (e.g., an on-board computer of the vehicle) that is configured to relay the information to a driver in a user friendly visual display.

In particular, a sensor may be configured to track changes in a measurable quantity based upon a change in electronic parameters (e.g., resistance, capacitance) of a measurement sensor element. The measurement sensor element provides a signal, based on the electronic parameters, to a measurement circuit that subsequently measures changes of the electric parameters of the sensor element. The changes may be converted into an output voltage or a digital signal that is provided to an evaluation circuit.

DETAILED DESCRIPTION OF THE INVENTION

Figure 1:
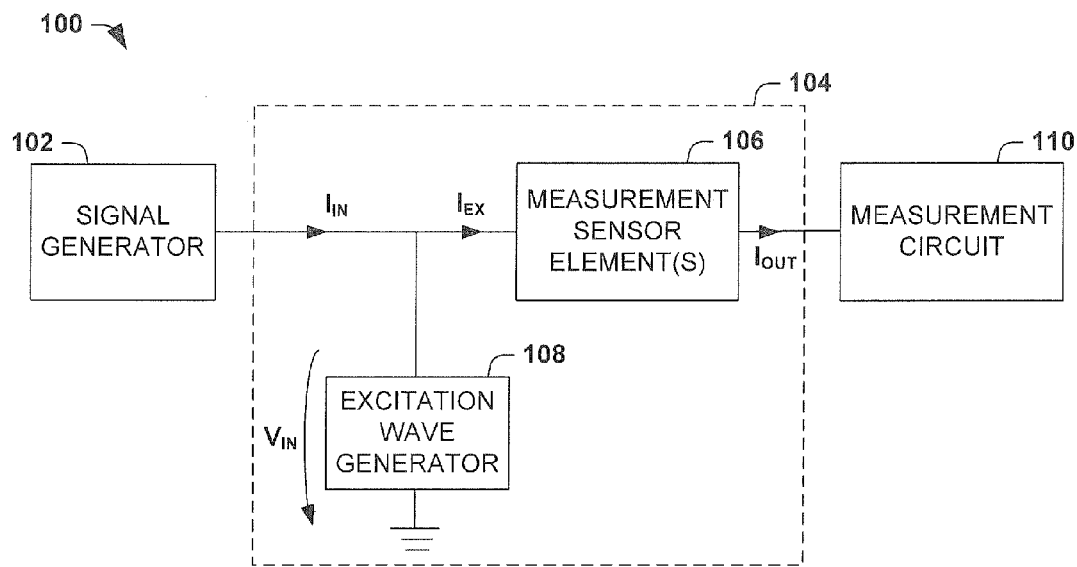
FIG. 1 illustrates a block diagram of a sensor system configured to generate a controlled transient response and measure capacitive and resistive components therefrom.

The present invention will now be described with reference to the attached drawing figures, wherein like reference numerals are used to refer to like elements throughout, and wherein the illustrated structures and devices are not necessarily drawn to scale.

Many sensor systems rely upon the use of electric fields to characterize measurable sensor parameters (e.g., the fluid level in a gas tank, the weight of an object on a seat, etc). Such sensor systems may form electric fields through the use of two or more electrodes, wherein one electrode comprises a driver configured to output a signal and the other electrode(s) act as receiver(s) configured to sense the effect that a measurable quantity (e.g., fuel level, tire pressure, etc.) has on the signal. By measuring changes in the signal, changes in the electric field and therefore changes in a measurable sensor parameter, can be determined.

Capacitive elements are a common form of electrical field sensor that is widely used in many sensor systems. Capacitive elements may comprise two electrodes separated from each other by a dielectric medium. Relative changes in capacitance (i.e., $\Delta C/C$) between the electrodes of a capacitive sensor may be measured by a measurement circuit and utilized to determine a change in external influence. For example, in a capacitive pressure sensor the capacity of a capacitive sensor changes when its electrodes are moved closer together as consequence of an increasing pressure. In other capacitive sensors, a change of dielectric material between capacitor electrodes causes a change in the dielectric constant between the electrodes resulting in a change in capacitance as measured by the sensors. Automotive systems may utilize capacitive sensor elements for seat occupation detectors, proximity detectors, fuel level gauges, etc.

However, in more complex sensor systems capacitive or resistive measurements alone may prove insufficient for sensor measurement purposes. For example, sensor systems configured to measure a plurality of parameters (e.g., fuel sensor systems configured to detect both the fuel level and the presence of conductive fuel additives) cannot depend upon only capacitive measurements. Instead such systems utilize measurements of more than one criteria (e.g., capacitance, resistance) in order to determine multiple changing parameters. For example, a measured resistance can be used to measure whether additives are present in a liquid, while a capacitance can be measured to determine an amount of the liquid.

Therefore, complex sensor systems may be configured to comprise both capacitive sensors and resistive sensing elements, resulting in sensor systems that measure both electrical resistance changes and capacitance changes. However, such sensor systems often rely upon different detection means to measure the resistance and capacitance, resulting in complex sensor systems that are costly to build and difficult to implement.

Accordingly, a method and apparatus for easily measuring multiple parameters (e.g., capacitive and/or resistive elements) of a sensor system are provided herein. In one embodiment, the method and apparatus comprise providing a controllable excitation voltage to one or more measurement sensor elements having capacitive and resistive components. The controllable excitation voltage provided to the measurement sensor elements may be controllably manipulated to cause capacitive and resistive components, comprised within the measurement sensor elements, to exhibit a transient effect. The resulting output current provided from the measurement sensor element, therefore has transient response characteristics (e.g., settling time, steady state amplitude), corresponding to the capacitive and resistive components, which can be selectively measured to easily determine multiple measurable sensor parameters (e.g., fuel concentration and fuel level).

For example, in one embodiment shown in FIG. 1, a signal generator 102 is configured to output an input load current $I_{IN}$ alternating between a first (e.g., high) current value and a second (e.g., low) current value. As shown in FIG. 1, a measurement element 104, comprising a measurement sensor elements 106 and an excitation wave generator 108, is configured to receive an input load current $I_{IN}$ and to generate a controllable excitation voltage $V_{IN}$ therefrom (i.e., a voltage potential $V_{IN}$ at the output of the excitation wave generator 108). In one particular embodiment, a ground capacitance (e.g., a parasitic capacitance) of a measurement element 104 (e.g., comprising measurement sensor elements). In such an embodiment, the ground capacitance receives the input load current and based upon the received input load current $I_{IN}$ acts as excitation wave generator to generate a controllable excitation voltage $V_{IN}$ (i.e., stores charges due to the input current $I_{IN}$ that result in a controllable excitation voltage $V_{IN}$ across the capacitor).

The measurement sensor element 106, comprising one or more capacitive and/or resistive components, is configured to receive the controllable excitation voltage $V_{IN}$, which is configured to cause a transient response of the capacitive and resistive components comprised therein. An output current $I_{OUT}$ (output current), having transient response characteristics, is output to a measurement circuit 110. The measurement circuit 110 is configured to receive the output current $I_{OUT}$ and to selectively measure the transient response characteristics (e.g., settling time, steady state amplitude) that correspond to the capacitive and resistive components. From these measured transient response characteristics the capacitive and resistive components may be easily determined.

Figure 2:
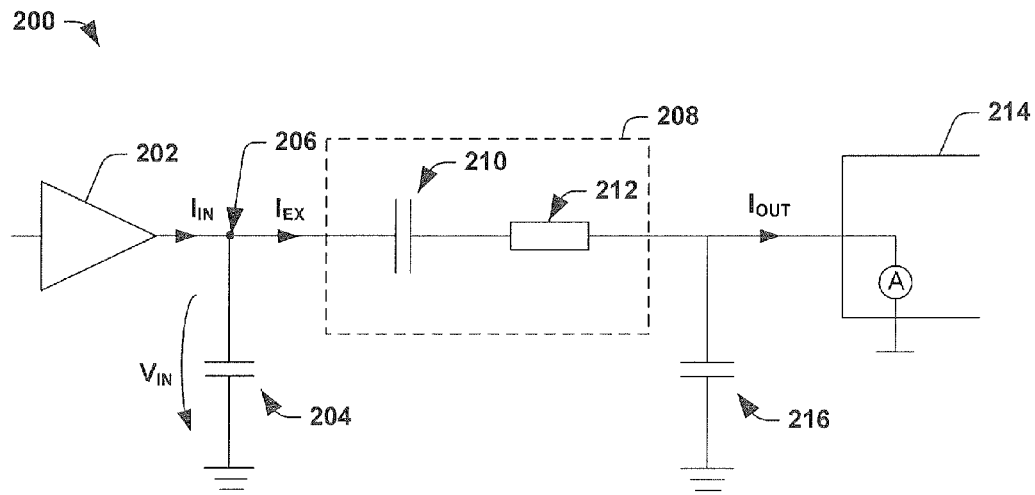
FIG. 2 illustrates a block diagram of a sensor system configured to provide an excitation voltage, comprising a voltage amplitude controlled signal, to a measurement device having capacitive elements and resistive elements.

FIG. 2 illustrates a more detailed embodiment of the present invention, wherein an excitation wave generator comprising a grounded capacitance 204 is configured to provide an excitation voltage $V_{IN}$ to a measurement sensor element 208 having capacitive components 210 and resistive components 212. It will be appreciated that the grounded capacitance may comprise a parasitic capacitance that is inherently present in the measurement element.

Figure 3:
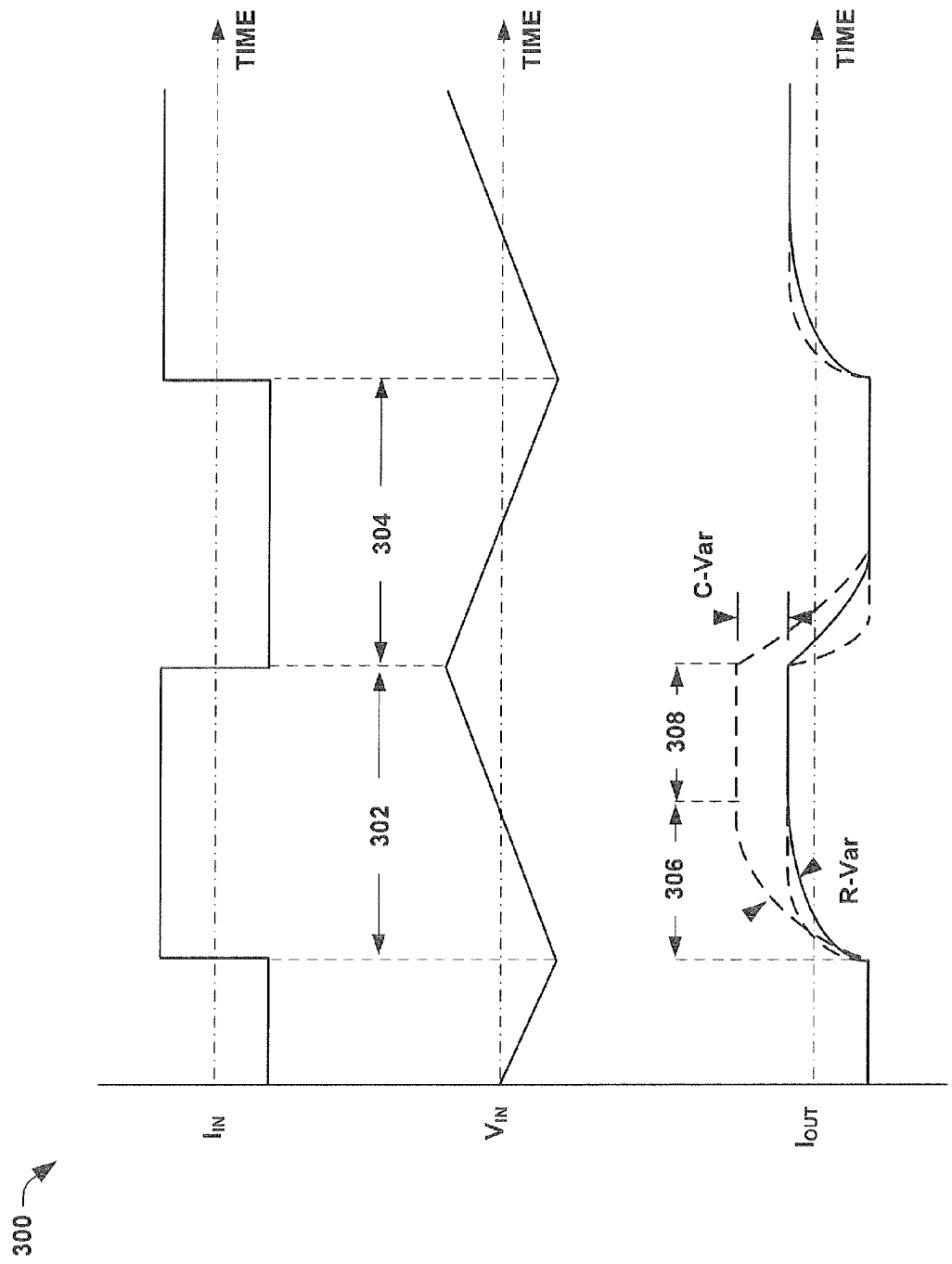
FIG. 3 is a signal diagram showing various signals associated with the measurement circuit of FIG. 2.

As shown in FIG. 2, a controllable excitation current, based upon an excitation voltage $V_{IN}$ that is formed by integrating the input current $I_{IN}$ using the parasitic grounded capacitor 204, regulates the current through a measurement sensor element 208, resulting in a transient output current $I_{OUT}$ having a transient response which varies based upon the values of the capacitive and resistive components. The transient response therefore can be measured to characterize the network (i.e., to determine the value of capacitive and resistive components of the measurement sensor element) without a disturbing influence of parasitic input capacitance to ground 204. FIG. 3 is a signal diagram 300 showing various signals ($I_{IN}$, $V_{IN}$, $I_{OUT}$) over time associated with the sensor system 200 to facilitate understanding of the present invention.

More particularly, as shown in FIG. 2, a current source 202 is configured to generate an input current $I_{IN}$ comprising a plurality of current pulses. The current source 202 may comprise a digital-to-analog converter (DAC) configured to output an analog input current based upon a received digital control signal, in one embodiment. In another embodiment, shown in FIG. 3, the current source may be configured to output an input current $I_{IN}$ comprising a plurality of rectangular current pulses. In alternative embodiments, the input current $I_{IN}$ may comprise alternatively shaped signals (e.g., naturally existing when implementing current-pulse generators) such as, for example, a signal having trapezoidal current pulses.

The input current $I_{IN}$ is provided to the parasitic ground capacitor 204, which works as an excitation wave generator. The capacitor integrates charges provided by the input current $I_{IN}$ resulting in a voltage potential $V_{IN}$. Based upon the voltage potential $V_{IN}$, the capacitor 204 is configured provide a controllable excitation voltage $V_{IN}$ comprising a controlled voltage and a controllable current to a measurement sensor element 208, wherein the controllable current is proportional to a change in the voltage potential $V_{IN}$ that the input load current $I_{IN}$ formed across capacitor 204. It will be appreciated that, in the measurement circuit of FIG. 2, the parasitic input-capacitances can be neglected during operation, which is a great advantage to system operation.

In one embodiment, shown in FIG. 3, the rectangular pulses of the input current $I_{IN}$ alternatively charges (e.g., drive charge into capacitor 204) and discharges the parasitic ground capacitor 204. As the capacitor 204 is alternatively charged and discharged, by the constant current provided by the input current $I_{IN}$, a varying potential voltage $V_{IN}$ having a linear voltage ramp will be established across the parasitic ground capacitance 204. The linear ramp voltage will result in an excitation current $I_{EX}$ comprising a controllable current that is constant over one period. In other words, since the excitation current $I_{EX}$ provided by the capacitor 204 is equal to the capacitance multiplied by the time derivative of the voltage $V_{IN}$ across the capacitor 204, the triangular voltage waveform $V_{IN}$ shown in FIG. 3, provides a controllable change of the voltage having a constant slope during one period resulting in an easily controlled output current $I_{OUT}$ that has a substantially rectangular waveform similar to the input current.

For example, as shown in FIG. 3, when the input current $I_{IN}$ is high, it will drive charge into the parasitic ground capacitance 204, thereby increasing the voltage potential $V_{IN}$ across the capacitor 204 (at node 206). This increase in the voltage potential $V_{IN}$ comprises a linear upward voltage ramp (shown at period 302). When the input current $I_{IN}$ is low the capacitor 204 discharges, thereby decreasing the voltage potential $V_{IN}$ across the capacitor 204 (at node 206). This decrease in the voltage potential $V_{IN}$ comprises a linear downward voltage ramp (shown at 304) that results in a constant excitation current $I_{EX}$.

The parasitic ground capacitor 204 is further coupled to a measurement sensor element 208 configured to receive the excitation current $I_{EX}$. The measurement sensor element may comprise two or more measurement electrodes. In various embodiments, the electrodes will have capacitive and/or resistive components, illustrated in measurement sensor element 208 as capacitive component 210, resistive component 212. As shown in FIG. 2, the measurement sensor element 208 is configured to receive a controllable excitation voltage which is further controlled by the input current $I_{IN}$. More particularly, the excitation voltage, generated with the help of the parasitic ground capacitor 204, controls the voltage and current that is provided to the measurement sensor element 208.

The triangular ramp voltage, shown in FIG. 3, results in an excitation current $I_{EX}$ having a current that comprises substantially rectangular pulses to the measurement sensor element. However, the capacitive and resistive elements 210 and 212 have a transient effect on the substantially rectangular current pulses as the excitation current moves from one stable state to another. The transient effect will comprise a settling region 306, wherein the current increases over a time period in which the response of the current comes within a range of the final value, and a steady state region 308 (e.g., the final value itself). As the excitation current $I_{EX}$ rises and falls the measurement sensor element 208 will consistently provide a transient response that alters the controllable rectangular pulses of the excitation current $I_{EX}$.

A measurement circuit 214 configured to receive the output current $I_{OUT}$, having a transient response, can measure characteristics of the transient response (e.g., the settling time, the steady state current value) and therefrom determine the values of the capacitive and resistive components of the measurement sensor element 208. In one embodiment, the measurement circuit 214 may comprise a current measurement apparatus (e.g., an ammeter) configured to measure the output current $I_{OUT}$. In one embodiment, a current measurement apparatus may be configured to have a voltage difference at the output that is nearly zero, thereby resulting in a parasitic output-capacitor 216 that is negligible.

In particular, the length of the settling time 306 is influenced by resistive component 212 of the measurement sensor element 208. For example, a variation in the resistance between measurement electrodes results in a variation of settling times, as shown by the $I_{OUT}$ dotted lines in FIG. 3. Therefore, by measuring the settling time 306 of the output current $I_{OUT}$ the measurement circuit 214 can measure the resistive component 212 of the measurement sensor element 208. Similarly, the amplitude of the steady state region 308 is influenced by the capacitive component 210 of the measurement sensor element 208. For example, changes in the value of the capacitive component (e.g., due to changes in the dielectric constant between measurement electrodes) will causes the steady state amplitude of the output current $I_{OUT}$ to increase or decrease. Therefore, by measuring the steady state amplitude 308 of the output current $I_{OUT}$ the measurement circuit 214 can measure the capacitive component 210 of the measurement sensor element 208. Accordingly, by measuring the settling time and the stead state value of the output current $I_{OUT}$ the resistive and capacitive components of the measurement sensor element may be determined.

In one particular example, the resistance between measurement electrodes is substantially zero resulting in an output current $I_{OUT}$ having a nearly square output wave. In such an embodiment, device 208 experiences capacitive coupling so that the output current $I_{OUT}$ comprises little transient behavior in the beginning (i.e., a settling time substantially equal to zero that would be measured as an output current having a nearly square waveform). Instead, the output current $I_{OUT}$ almost immediately jumps to the steady state value, which varies with the size of capacitive element 210 (since the change rate of the voltage $V_{IN}$ is constant).

Accordingly, as provided herein, the measurement circuit 200 relies upon the transient behavior of an output current $I_{OUT}$ to easily detect multiple measurable sensor parameters (e.g., fuel concentration and fuel level) through the measurement of resistive components (based upon a settling time) and/or capacitive components (based upon a change in the amplitude).

Figure 4A:
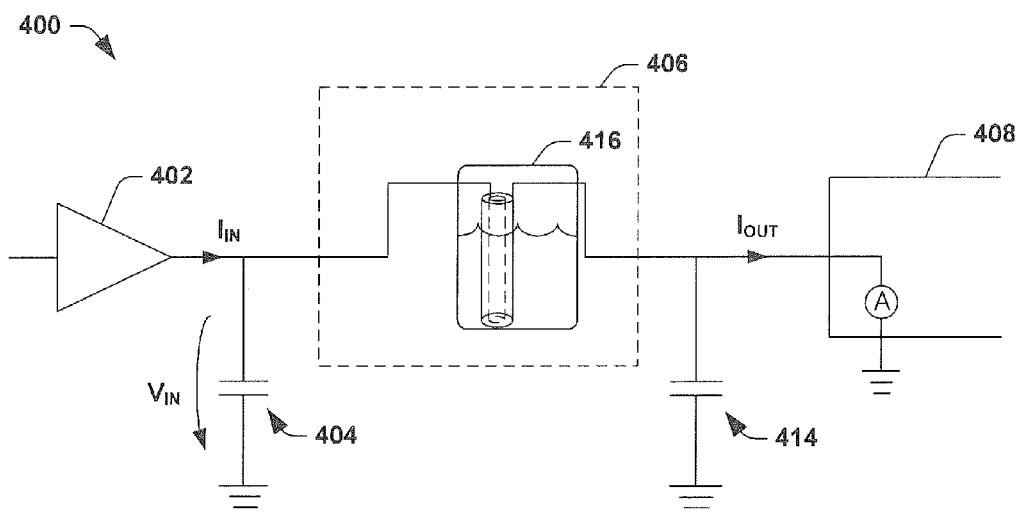
FIG. 4A illustrates a measurement device comprising a fuel tank having a first electrode and a second electrode that are separated by the content of the fuel tank.
Figure 4B:
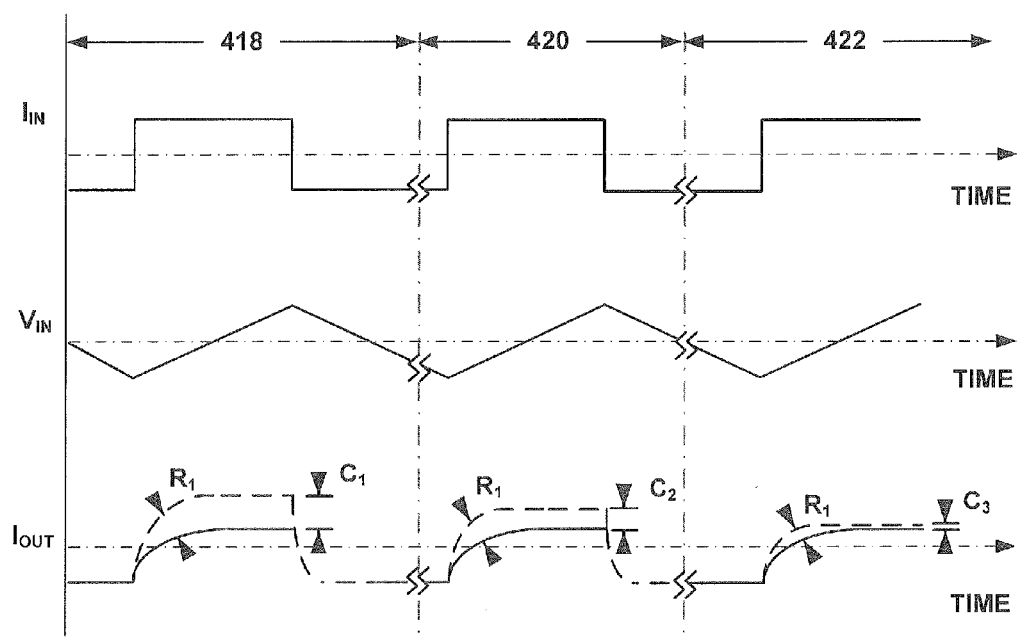
FIG. 4B illustrates signals within the measurement circuitry of FIG. 4A as a function of time.

It will be appreciated that as measurable sensor parameters (e.g., fuel level, tire pressure, etc.) change, the transient characteristics of the output current $I_{OUT}$ will change in response. For example, FIGS. 4A and 4B illustrate an example of how transient characteristics corresponding to capacitive and resistive components of the measurement sensor element may change over time for a fuel measurement sensor (e.g., in an automobile fuel system). In particular, FIG. 4A illustrates a measurement circuit 400 comprising a fuel tank 416 with a fuel tank measurement device having a first electrode and a second electrode that are separated by the content of the fuel tank. FIG. 4B illustrates a signal diagram illustrating signals within the measurement circuitry of FIG. 4A as a function of time.

The content of the fuel tank may comprise a petro based fuel having a level (e.g., fuel amount) which can be determined by measuring a capacitance between the two measurement electrodes. Additionally, the presence of any fuel additives can be determined by measuring a resistance between the two measurement electrodes. During a first time period 418, when the fuel tank 416 is substantially full, the capacitance and resistance measured between the measurement electrodes is respectively equal to values $C_1$ and $R_1$. The capacitance value $C_1$ corresponds to a relatively full fuel tank since the large amount of fuel in the tank provides for a large dielectric value ($\in$) between measurement electrodes. The resistance $R_1$ may correspond to the presence of a particular fuel additive present in the fuel tank.

As the amount of fuel in the tank decreases, the dielectric value between measurement electrodes decreases, resulting in a decrease in the measured capacitance (e.g., $C_x = \in_r C_o$, wherein Co is the capacitance without a dielectric between electrodes). For example, during a second time period 420, a capacitive value $C_2$ is measured, wherein $C_2 < C_1$. The smaller capacitive value $C_2$ indicates that the dielectric constant between measurement electrodes has decreased due to a drop in the amount of fuel in the fuel tank 416. During a third time period 422, a capacitive value $C_3$ is measured, wherein $C_3 < C_2$. The smaller capacitive value of $C_3$, nearly equal to a capacitance having a dielectric constant of air ($\in_r \sim 1$), indicates that the fuel tank 416 is substantially empty. Accordingly, by measuring the steady state and settling time of the transient response of the output current $I_{OUT}$, the capacitance (and therefore the fuel level) and the resistance (and therefore the additive) may be used to easily determine multiple measurable sensor parameters (e.g., fuel concentration and fuel level) of the sensor system.

Although FIGS. 4A and 4B describe the application of a sensor system for use in a fuel measurement sensor, these figures are not intended to limit the application of the sensor system disclosed herein. Instead, FIGS. 4A and 4B illustrate one non-limiting example of an exemplary application of the present invention to facilitate a reader's understanding of the sensor system. It will be appreciated that the sensor system provided herein may be used in a wide range of applications including automotive applications (e.g., seat air bag sensors) and non-automotive applications.

Figure 5:
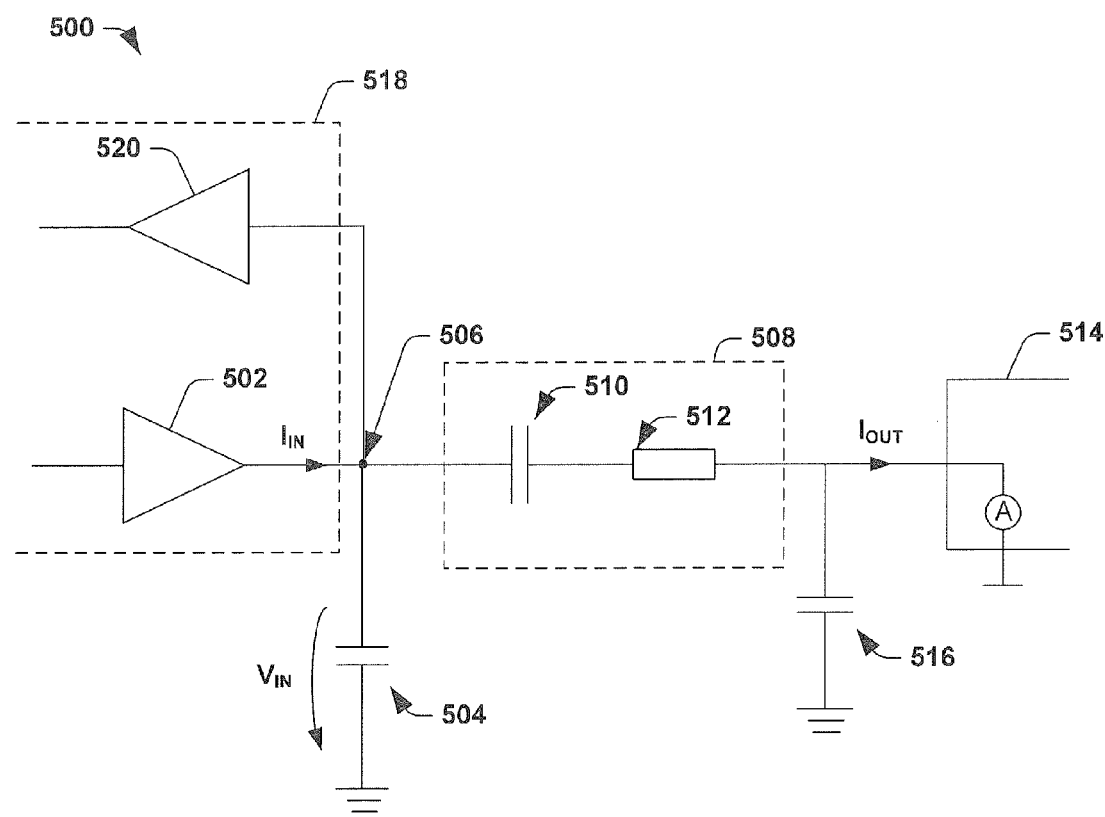
FIG. 5 illustrates a sensor system provided herein further comprising a feedback loop to measure the resulting excitation voltage.

FIG. 5 illustrates an alternative embodiment of the present invention, wherein a sensor system 500 is configured to further comprise a feedback loop 518 to measure the resulting excitation voltage. In one embodiment, the feedback loop 518 may be configured to adjust operation voltage levels by providing a feedback based upon the value of the voltage $V_{IN}$ at the input of the measurement device (node 506). The feedback loop 518 may comprise an analog-to-digital converter (ADC) 520 configured to measure back voltages and a digital-to-analog converter (DAC) 502 configured to provide an input current $I_{IN}$. The feedback loop 518 may be configured to control the amplitude of the output current $I_{OUT}$ at the output of the measurement sensor element 508, by changing the input current $I_{IN}$ to the measurement sensor element 508. The feedback loop 518 therefore allows adjustment to the input current $I_{IN}$ that is independent of the network to which it is connected, to achieve the maximum output $I_{OUT}$.

In one embodiment, the input current $I_{IN}$ may be changed so that the current provided to the parasitic capacitor 504 is adapted to an optimal range to perform measurements of the capacitive and resistive elements 510 and 512. For example, the feedback loop 518 may be configured to provide an input current $I_{IN}$ having a maximum allowable voltage amplitude $V_{IN}$ in order to get the highest possible capacity for the measurement. The feedback loop may be especially useful in changing the amplitude of the input current $I_{IN}$ in cases where relatively large parasitic capacitances 216 are present in the system. For example, transmission line capacitances may be present and can have an effect on the measured resistive and capacitive components if the input current $I_{IN}$ is too small.

It will be appreciated that the measurement circuit (e.g., corresponding to 214) may comprise various circuitry configured to employ various techniques to determine the capacitive and resistive components of measurement sensor element from the transient response of the output current $I_{OUT}$. In one embodiment, demodulation principles may be used to extract data concerning the settling time (resistance) and the steady state value (capacitance) from respective pulses of a received output current $I_{OUT}$. In alternative embodiments, sampling or phase difference measurements may also be used to obtain resistive and capacitive components from the transient response of the output current $I_{OUT}$.

Figure 6A:
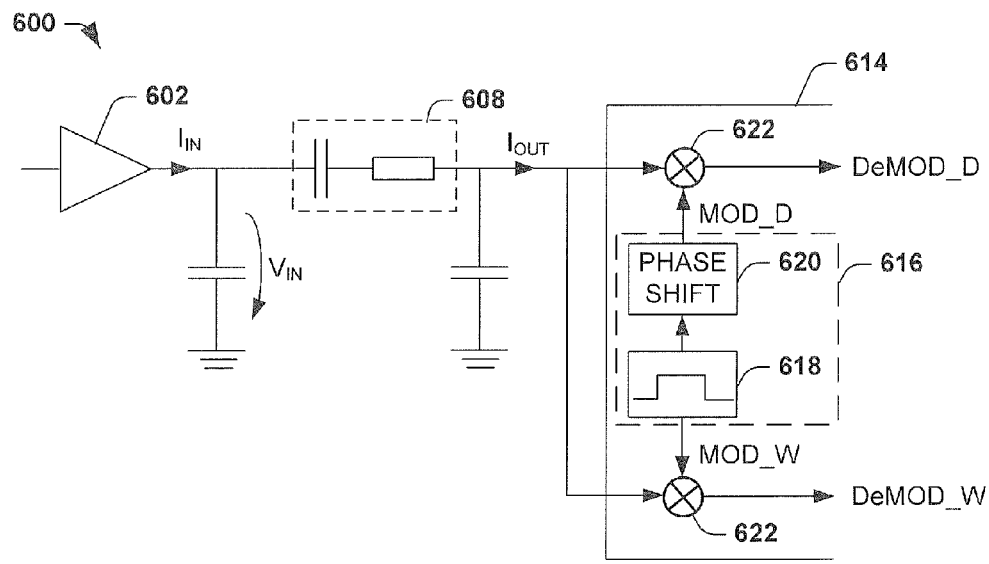
FIG. 6A illustrates a block diagram of one embodiment of a sensor system comprising a measurement circuit for determining capacitive and resistive components of a measurement device.

FIG. 6A illustrates one embodiment of a sensor system 600 comprising a measurement circuit 614 that may be used to determine the capacitive and resistive components of a measurement sensor element 608 from the transient response of the output current $I_{OUT}$. The measurement circuit 614 shown in FIG. 6A comprises a demodulation generator 616 configured to generate a first differential phase demodulation signal Mod_D and a second with phase demodulation signal Mod_W. In one embodiment, the demodulation generator 616 may comprise a signal generator 618 and a phase shifter 620. The signal generator 618 is configured to output the first and second demodulation signals, Mod_D and Mod_W. The phase shifter 620 is configured to shift the phase of the first demodulation signal, Mod_D, resulting in a demodulation signal Mod_D (output from demodulation generator 616) having a phase shift relative to demodulation signal Mod_W. The first and second demodulation signals (Mod_W, Mod_D) may be provided to first and second multipliers 622 configured to multiply the output current $I_{OUT}$ with the first and second demodulation signals, thereby resulting in demodulated components Demod_W and Demod_D that may be used to determine the resistive and/or capacitive components from the transient response of the output current $I_{OUT}$. In alternative embodiments, the demodulation generator 616 may comprise alternative circuitry to generate demodulation signals having a phase difference therebetween.

Figure 6B:
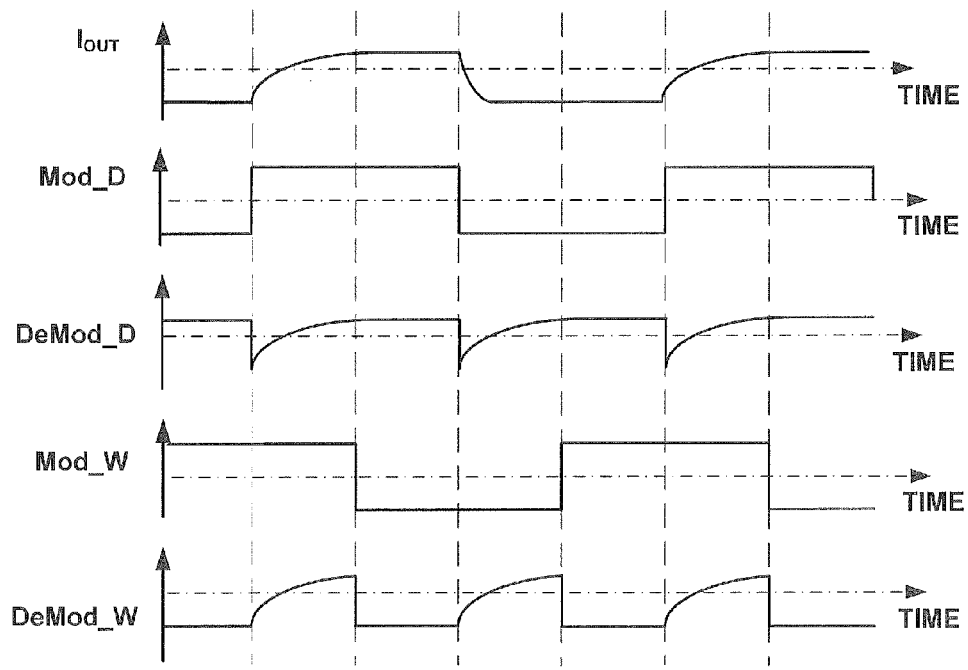
FIG. 6B illustrates one embodiment of demodulation signals produced by the sensor system of FIG. 6A.

In one embodiment, shown in FIG. 6B, the demodulation signals comprise simple rectangular demodulation signals (Mod_W, Mod_D), having a 90 degree phase shift therebetween. The demodulation signals (Mod_W, Mod, D) are configured to demodulate the received output current ($I_{OUT}$) into different components (Demod_W, Demod_D) that may be used to determine the resistive and/or capacitive elements of the received output current.

In particular, a first demodulation signal Mod_D is multiplied with the output current $I_{OUT}$. The first demodulation signal Mod_D inverts the polarity of the output current $I_{OUT}$ when the demodulation signal is low, thereby resulting in a differential phase demodulated signal Demod_D that focuses on the steady state of the output current. The resultant differential phase demodulated signal Demod_D may be used to determine the capacitive component of the measuring device (e.g., Demod_D provides a current value over a steady state that can be integrated to provide an amount of charge output from the measurement sensor element, since I=dQ/dt. Based upon the amount of charge, a computer based algorithm may be used to measure the capacitive component of the measuring device (C=Q/V)).

A second demodulation signal Mod_W, having a 90 degree phase shift with respect to the first demodulation signal, is multiplied with the output current $I_{OUT}$. The second demodulation signal Mod_W inverts the polarity of the output current $I_{OUT}$ when the demodulation signal is low, thereby resulting in a with phase demodulated signal Dennod_W that focuses on the slope changes of the output current $I_{OUT}$. Therefore, the resultant with phase demodulated signal Demod_W isolates a portion of the waveform that may be used to determine the resistive component of the measurement sensor element (e.g., Demod_W provides for a change in current over time from which the resistive component of the measurement sensor element can be determined. For example, using the measured capacitance (C), a current measured at a first time ($I_0$), a current measured at a second time (I), and a time between the first and second time (t) a computer algorithm may be implemented to determine the resistance using the equation $I=I_0 e^{-t/RC}$). Accordingly, demodulation allows analysis to be focused upon different areas of the output current signal.

Figure 6C:
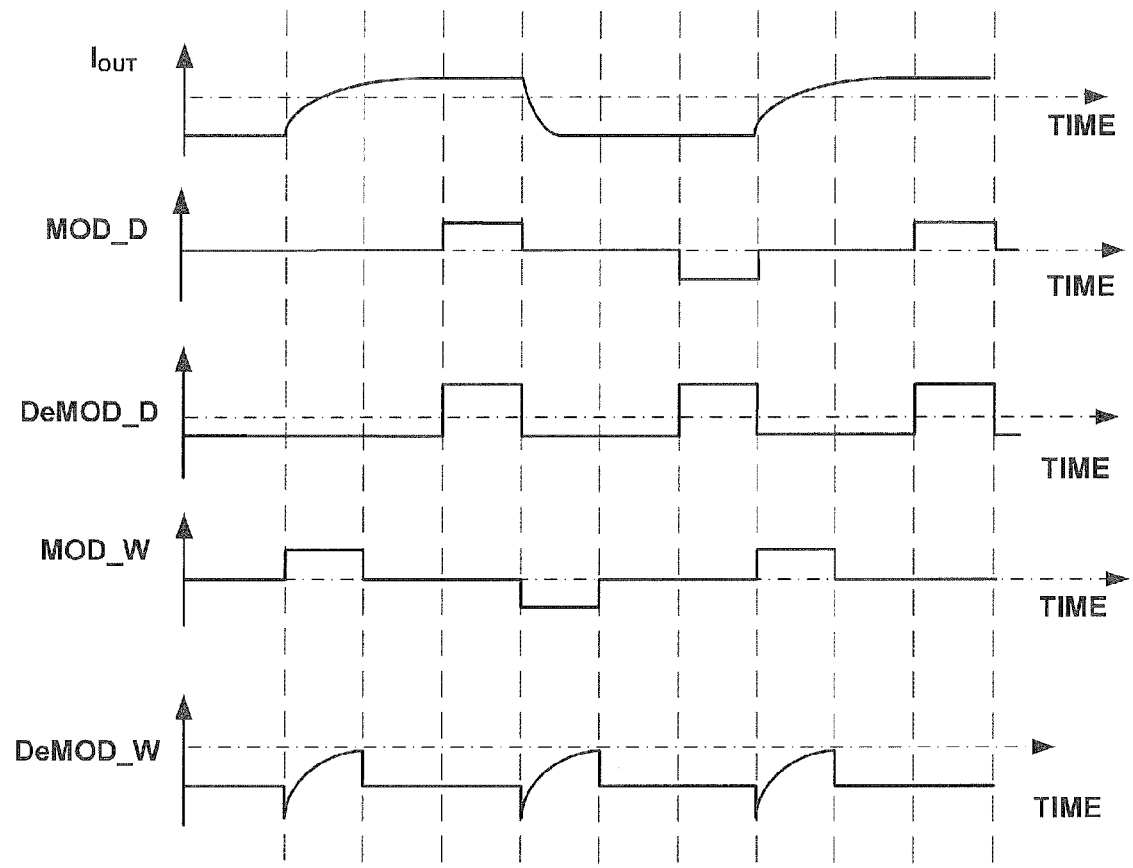
FIG. 6C illustrates an alternative embodiment of demodulation signals produced by the sensor system of FIG. 6A

In another embodiment, shown in FIG. 6C, the demodulation signals comprise simple rectangular windowed demodulation signals. As shown in FIG. 6C, demodulation signals (Mod_D, Mod_W) comprising two different demodulation windows may be utilized to demodulate the received output current $I_{OUT}$ into demodulated signals (Demod_D, Demod_W) having different components that focus on either the steady state or settling time of the transient response of the output current.

In one embodiment, the differential phase demodulated signal Demod_D contains steady state regions of the output current $I_{OUT}$ and the with phase demodulated signal contains settling time regions of the output current $I_{OUT}$. For example, the differential phase demodulation window signal Mod_D may be multiplied with the output current $I_{OUT}$ resulting in a demodulated signal Demod_D having steady state current that may be used to determine components related to the capacitance of the received output current (e.g., in the same manner described in FIG. 6B). The with phase demodulation window signal Mod_W may be multiplied with the output current $I_{OUT}$ resulting in a demodulated signal Demod_W comprising a current from which the settling time may be used to determine components related to the capacitance of the received output current (e.g., in the same manner described in FIG. 6B).

Figure 7A:
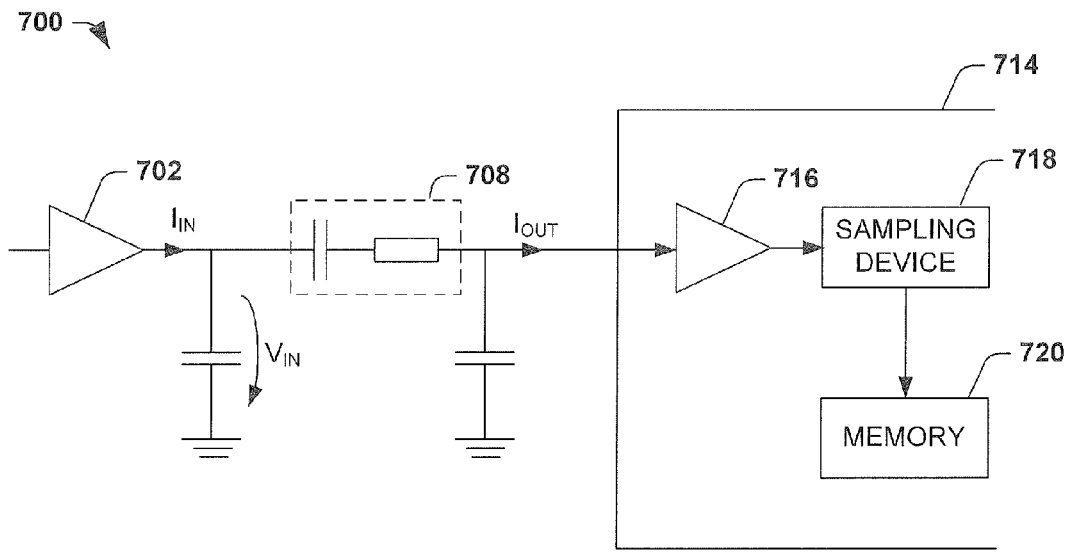
FIG. 7A illustrates a block diagram of an alternative embodiment of a sensor system comprising a measurement circuit for determining capacitive and resistive components of a measurement device.
Figure 7B:
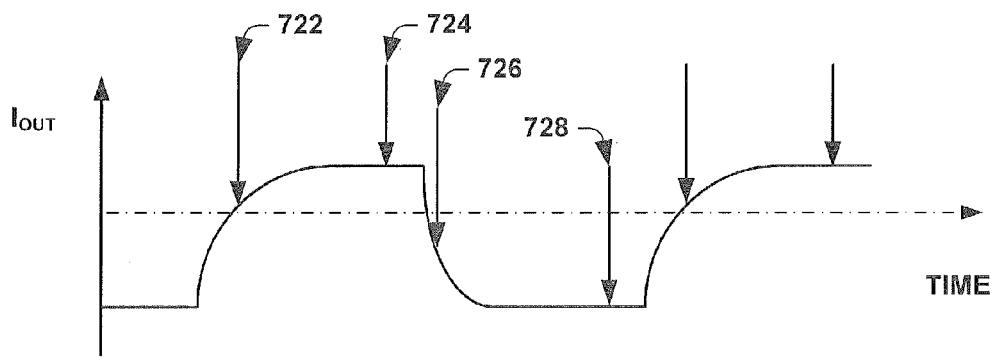
FIG. 7B illustrates one embodiment of sampling that may be performed by the sensor system of FIG. 7A.

FIGS. 7A-7B illustrate another alternative embodiment, wherein sampled values of the output current $I_{OUT}$, taken at various times, are to determine components related to the capacitance of the received output current. FIG. 7A illustrates a measurement circuit 714 comprising an analog to digital converter (ADC) 716 configured to output a digital signal to a sampling device 718 and a memory 720. The ADC 716 receives the output current $I_{OUT}$ and converts the analog signal to a digital signal that may be sampled by the sampling device 718. The sampling device 718 samples various points along the digital signal and stores the sampled values in a memory 720. The sampled values may subsequently be used to determine the capacitive and resistive values of the measurement sensor element.

More particularly, as shown in FIG. 7B, the sampling device may measure a sample at points 722, 724, 726, and 728 for a pulse of the output current $I_{OUT}$. The capacitance may be determined from an amplitude provided by sampled value 724. The resistance may be determined from a difference in the amplitudes measured between sample values 722 and 724 (or 726 and 728). The difference in amplitude may be utilized along with the time between the measurements (e.g., the number of clock cycles between to determine a settling time and therefore a resistive component. For example, if the amplitude difference between sampled value 722 and 724 is substantially equal to zero, the resistive component may also be substantially equal to zero. If the resistance increases the sample value 724 does not change but the sample value 722 does change. The larger the resistance the larger the difference between 716 and 724. Therefore the measurement of 724 may be used to determine the capacitive effect while the difference between the measurement at 722 and the measurement at 724 may be used to determine the capacitance of the measurement sensor element.

Figure 8A:
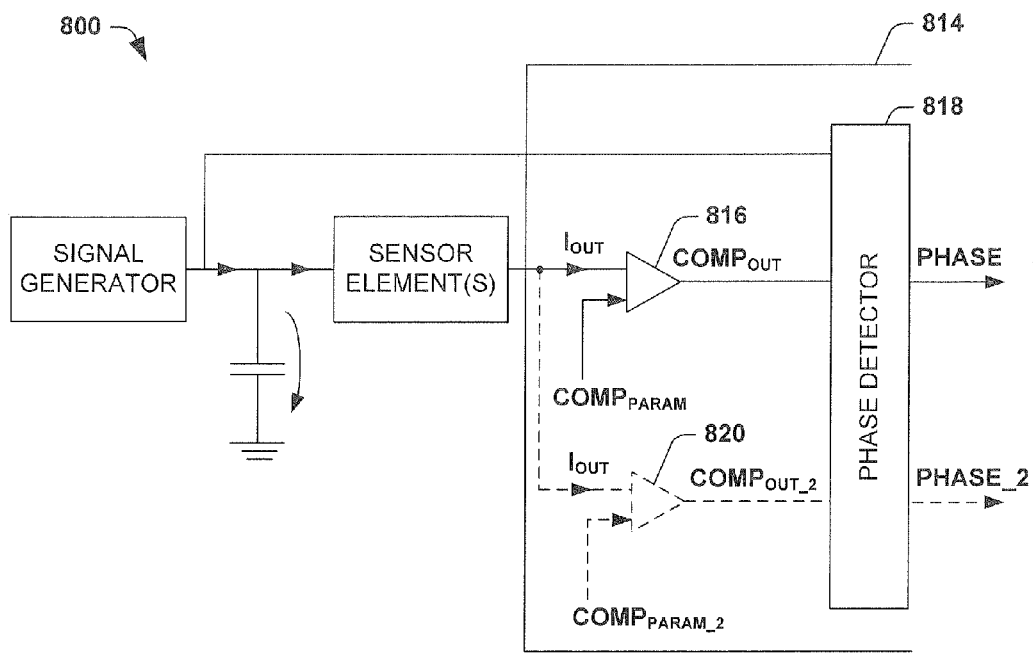
FIG. 8A illustrates a block diagram of another alternative embodiment of a sensor system comprising a measurement circuit for determining capacitive and resistive components of a measurement device.
Figure 8B:
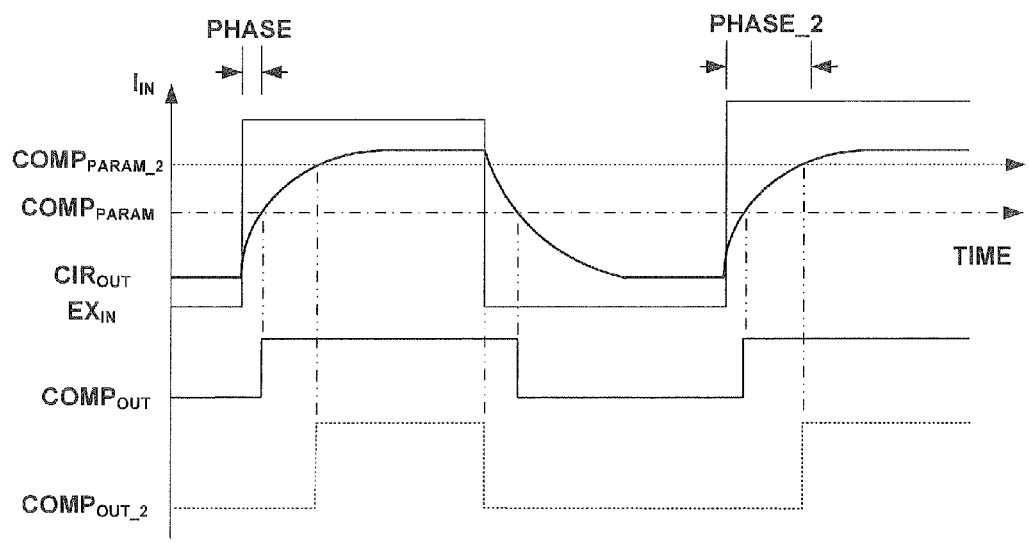
FIG. 8B illustrates one embodiment of phase differences that may be performed by the sensor system of FIG. 8A.

FIGS. 8A-8B illustrate yet another alternative embodiment, wherein the phase relation of the output currents may be compared to the input stimulus to determine the resistive component of the measurement sensor element. FIG. 8A illustrates a measurement circuit 814 comprising a comparator 816 and a phase detector 818. The comparator is configured to receive and compare an output current $I_{OUT}$ and a comparator parameter $COMP_{PARAM}$ (shown in FIG. 8B as a dashed line). When the output current of the circuit becomes larger than the comparator value, the output of the comparator is high. Alternatively when the output current is smaller than the comparator value the output of the comparator is low. Based upon the comparison, the comparator outputs a signal $COMP_{OUT}$ to a phase detector configured to receive the comparison signal $COMP_{OUT}$ and the input current $I_{IN}$, and to measure the phase difference therebetween. The phase difference, output as an error signal, may be subsequently utilized to determine transient determine components related to the capacitance of the received output current.

In particular, the measurement circuit 814 is configured to measure an output current amplitude and a phase difference between the rising edge of the input current $I_{IN}$ and the rising edge of the comparator output $COMP_{OUT}$. The capacitive value may be measured from the amplitude of the output current. The resistive value may be determined from the phase difference. As the phase difference between the input current $I_{IN}$ and the comparator output $COMP_{OUT}$ increases, the value of the resistive element increases. Similarly, when the phase difference between the input current $I_{IN}$ and the comparator output $COMP_{OUT}$ decreases, the value of the resistive element decreases.

Figure 9:
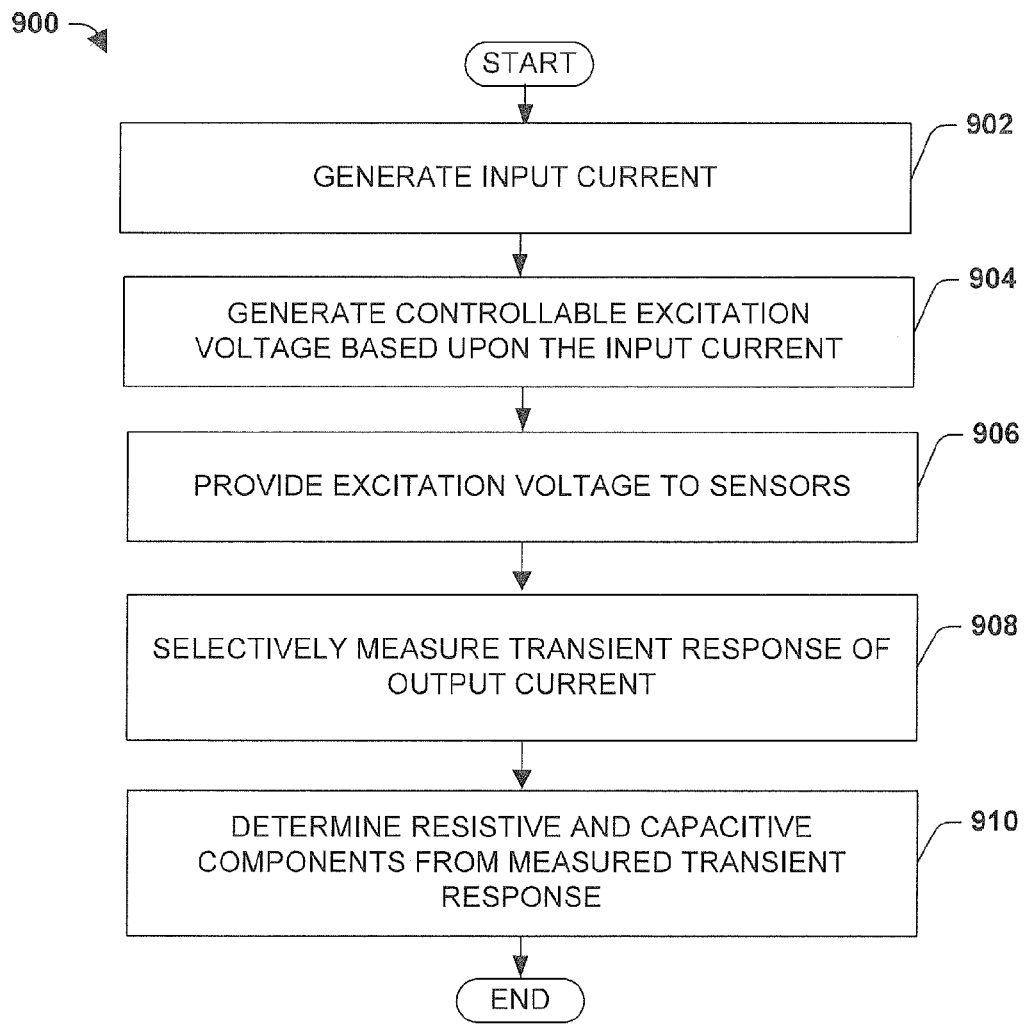
FIG. 9 is a flow diagram illustrating an exemplary method for measuring capacitive and/or resistive elements of a sensor system.

In one embodiment, the measurement circuit 814 is configured to comprise a second comparator configured to calculate resistive and capacitive components. As shown in FIG. 8, the measurement circuit 814 comprises a first comparator 816 and a second comparator 820, wherein the first and second comparators have different compare-values, $COMP_{PARAM}$ and $COMP_{PARM\_2}$, to get two different phases, PHASE and PHASE_2. The time-differences between $COMP_{OUT}$ and $COMP_{OUT\_2}$ as well as the time between the excitation-signal and $COMP_{OUT}$ or $COMP_{OUT\_2}$ can be used to extract the resistive and capacitive component of the sensor-element FIG. 9 is a flow diagram illustrating an exemplary method for measuring capacitive and/or resistive elements of a sensor system. The method comprises generating an input load current that is provided to an excitation voltage generator configured to generate an input current therefrom. The excitation signal, comprising a voltage amplitude controlled current, is provided to a measurement sensor element. The excitation signal controls the current through the measurement sensor element, thereby causing capacitive and resistive elements of a measurement sensor element to exhibit transient effect. Resulting output currents, from the measurement sensor element, therefore have a transient response that can be measured by a measurement circuit. Measured characteristics of the transient response (e.g., the settling time, amplitude) can then be used to easily characterize the network (e.g., to measure multiple measurable sensor parameters by determining the value of capacitive and resistive measurement sensor elements).

While method 900 is illustrated and described below as a series of acts or events, it will be appreciated that the illustrated ordering of such acts or events are not to be interpreted in a limiting sense. For example, some acts may occur in different orders and/or concurrently with other acts or events apart from those illustrated and/or described herein. In addition, not all illustrated acts may be required to implement one or more aspects or embodiments of the disclosure herein. Also, one or more of the acts depicted herein may be carried out in one or more separate acts and/or phases.

At 902 an input current is generated. The input current may comprise a trapezoidal current pulse varying between a first and a second current value (e.g., a high and a low data state value) over time. In one particular embodiment, the input current may comprise a substantially rectangular current pulse.

An excitation voltage is generated based upon the input current at 904. The excitation voltage may be generated by a simple circuitry configured to produce a controllable input voltage. In one embodiment, the simple circuitry is configured to produce a voltage controllable signal that regulates the voltage and current through a measurement sensor element so as to result in an output current having a transient response which varies based upon the values of the capacitive and resistive measurement sensor elements.

In one embodiment, the excitation voltage may be generated by a parasitic ground capacitor that is charged and discharged in response to the received input current. In particular, when the input current is high the capacitor stores charges of the input current in the capacitor to result in a voltage potential. When the input current is low the capacitor discharges the stored charges resulting in an excitation voltage comprising a triangular waveform having a linear voltage ramp. The capacitor therefore allows for an excitation voltage having a controllable voltage to be generated.

The excitation voltage is provided to one or more measurement sensor elements at 906. The measurement sensor elements, having capacitive and/or resistive components, cause a transient effect to occur due to variation of the excitation voltage. For example, the excitation voltage may result in a substantially square current being input into the measurement sensor elements. The capacitive and resistive elements of the measurement sensor elements may result in a settling time (i.e., a response time) during which changes in the substantially square current (e.g., from a low current to a high current) gradually increases/decreases until a steady state is reached.

The transient response of the output current is selectively measured at 908. In one embodiment, the transient response is selectively measured to determine the value of capacitive and resistive elements of the measurement sensor element. In one embodiment, the measurement may be performed using demodulation principles to extract data concerning the settling time (resistance) and the static value (capacitance) from respective pulses of a received output current $I_{OUT}$. In particular, a first and a second demodulation signals (e.g., having a 90 degree phase shift therebetween) may be generated and then multiplied with the output current to form a first and a second demodulated signal. The first demodulated signal focuses on the settling region of the transient response, from which the resistive component can be determined. The second demodulated signal focuses on the steady state region of the transient response, from which the capacitive component can be determined.

In an alternative embodiment, the measurement may be performed utilizing selectively sampling values of the output current. In yet another alternative embodiment, the measurement may be performed by measuring the or phase difference measurements to obtain resistive and capacitive components from the transient response of the output current $I_{OUT}$.

At 910 the capacitive and/or resistive components of the output current are determined based upon the measurements. For example, a measurement of the settling time may be utilized to determine resistive components of the measurement sensor element, while a steady state current vale may be utilized to determine capacitive components of the measurement sensor element.

Although the invention has been illustrated and described with respect to one or more implementations, alterations and/or modifications may be made to the illustrated examples without departing from the spirit and scope of the appended claims. In particular regard to the various functions performed by the above described components or structures (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the invention. In addition, while a particular feature of the invention may have been disclosed with respect to only one of several implementations, such feature may be combined with one or more other features of the other implementations as may be desired and advantageous for any given or particular application. Furthermore, to the extent that the terms "including", "includes", "having", "has", "with", or variants thereof are used in either the detailed description and the claims, such terms are intended to be inclusive in a manner similar to the term "comprising".

What is claimed is:

1. A sensor module, comprising:
    a signal generator configured to generate an input current alternating between high and low current values;
    a measurement element configured to receive the input current and to generate a controllable excitation voltage;
    a measurement sensor element comprising one or more capacitive components and one or more resistive components, the measurement sensor element configured to receive the controllable excitation voltage and based thereupon to provide an output current having transient response characteristics comprising a settling time and a steady state amplitude; and
    a measurement circuit configured to receive the output current and to selectively determine values of the one or more capacitive components from the steady state amplitude and to selectively determine separate values of the one or more resistive components from the settling time.

2. The sensor module of claim 1, wherein the measurement element comprises a grounded parasitic capacitance connected in parallel with the measurement sensor element.

3. The sensor module of claim 2, wherein the input current comprises a plurality of substantially rectangular pulses configured to alternatively charge and discharge the grounded parasitic capacitor, thereby resulting in a ramped voltage potential across the grounded parasitic capacitor that provides the controllable excitation voltage.

4. The sensor module of claim 2, wherein the measurement circuit is configured to selectively sample values of the received output current and to determine the values of the one or more capacitive components from an amplitude of the sampled value and to determine the separate values of the one or more resistive components from a difference in amplitude between the sampled values.

5. The sensor module of claim 2, wherein the measurement circuit comprises:
    a demodulation circuit configured to generate a first demodulation signal and a second demodulation signal;
    a first multiplier configured to multiply the first demodulation signal and the output current, thereby resulting in a first demodulated signal that may be utilized to determine the settling time from which the separate values of the one or more resistive components can be determined; and
    a second multiplier configured to multiply the second demodulation signal and the output current, thereby resulting in a second demodulated signal that may be utilized to determine the steady state amplitude from which the values of the one or more capacitive components can be determined.

6. The sensor module of claim 2, wherein the measurement circuit comprises:
    a comparator configured to compare the output current to a comparison parameter and therefrom to generate a comparison output signal; and
    a phase detector configured to receive the comparison output signal and the input current, and to measure a phase difference therebetween, wherein the separate values of the one or more resistive components may be determined based upon the phase difference.

7. The sensor module of claim 6, wherein the measurement circuit further comprises:
    a second comparator configured to compare the output current to a second comparison parameter and therefrom to generate a second comparison output signal,
    wherein phase differences between the first and second comparison output signals and phase differences between the second comparison output and the input current can be used to extract the separate values of the one or more resistive components and the values of the one or more capacitive components.

8. The sensor module of claim 1, wherein the signal generator is comprised within a feedback loop configured to adjust operation levels of the output current by providing a current to the feedback loop based upon a value of the controllable excitation voltage at an input of the measurement sensor element.

9. The sensor module of claim 1, wherein the signal generator comprises an analog-to-digital converter configured to provide the input current based upon a received control signal.

10. A method for performing capacitive measurements in a sensor module, comprising:
    generating an input current alternating between a high current value and a low current value;
    generating a controllable excitation voltage based upon the input current;

providing the controllable excitation voltage to a measurement sensor element having capacitive and resistive components, wherein the measurement sensor element is configured to generate an output current from the controllable excitation voltage that has a transient response comprising a settling time and a steady state amplitude based upon the capacitive and resistive components;

selectively measuring the settling time and the steady state amplitude; and determining a value of the capacitive components from the steady state amplitude and determining a value of the resistive components from the settling time.

11. The method of claim 10, wherein the controllable excitation voltage is generated by storing charges of the input current when the input current comprises the high current value and discharging the stored charges when the input current comprises the low current value, thereby resulting in a ramped voltage potential that further provides a controllable current to the measurement device.

12. The method of claim 11, wherein the input current comprises a plurality of rectangular pulses.

13. The method of claim 10, wherein selectively measuring the settling time and the steady state amplitude comprises selectively sampling values of the output current.

14. The method of claim 10, wherein selectively measuring the settling time and the steady state, comprises:

generating a first demodulation signal and a second demodulation signal;

multiplying the first demodulation signal and the output current to form a first demodulated signal from which values of the resistive components can be determined; and multiplying the second demodulation signal and the output current to form a second demodulated signal from which values of the capacitive components can be determined.

15. The method of claim 14, wherein the first demodulation signal is phase shifted by substantially 90 degrees with respect to the second demodulation signal.

16. The method of claim 10, further comprising:

comparing the output current to a comparison parameter and therefrom generating a comparison signal; and measuring a phase difference between the comparison signal and the output current and determining values of the resistive components therefrom.

17. The method of claim 10, further comprising generating a feedback signal configured to adjust operation levels of the output current by providing a current to the feedback loop based upon a value of the controllable excitation voltage at an input of the measurement sensor element.

18. A sensor module, comprising:

a signal generator configured to generate an input current comprising a plurality of trapezoidal current pulses alternating between a first current value and a second current value, larger than the first current value;

a grounded parasitic capacitor configured to generate a controllable excitation voltage by integrating charges provided by the input current when the input current is at the second current value and further configured to discharge the charges when the input current is at the first current value;

a measurement sensor element comprising one or more capacitive components and one or more resistive components, the measurement sensor element configured to receive the controllable excitation voltage and to provide an output current having transient response characteristics comprising a settling time and a steady state amplitude; and a measurement circuit configured to receive the output current and to determine values of the one or more capacitive components by selectively measuring the steady state amplitude, and to determine values of the one or more resistive components by selectively measuring the settling time.

* * * * *